(12) United States Patent
Diewald et al.

(10) Patent No.: US 9,864,420 B2
(45) Date of Patent: Jan. 9, 2018

(54) ENERGY TRACKING CIRCUIT

(71) Applicant: TEXAS INSTRUMENTS DEUTSCHLAND GMBH, Freising (DE)

(72) Inventors: Horst Diewald, Freising (DE); Johann Zipperer, Unterschleissheim (DE); Peter Weber, Allershausen (DE); Anton Brauchle, Mering (DE)

(73) Assignee: TEXAS INSTRUMENTS DEUTSCHLAND GMBH, Freising (DE)

( * ) Notice: Subject to any disclaimer, the term of this patent is extended or adjusted under 35 U.S.C. 154(b) by 335 days.

(21) Appl. No.: 14/517,257

(22) Filed: Oct. 17, 2014

(65) Prior Publication Data

US 2016/0109490 A1 Apr. 21, 2016

(51) Int. Cl.
*G01R 1/20* (2006.01)
*G06F 1/26* (2006.01)
*G06F 1/32* (2006.01)

(52) U.S. Cl.
CPC ............... *G06F 1/26* (2013.01); *G06F 1/3212* (2013.01); *Y02B 60/1292* (2013.01)

(58) Field of Classification Search
CPC ............ G01R 31/282; G01R 31/31924; G01R 31/3004; G01R 31/30
USPC ................................. 324/762.01, 537
See application file for complete search history.

(56) References Cited

U.S. PATENT DOCUMENTS

| 4,819,272 A * | 4/1989 | Shimo | H04B 1/1607 330/202 |
|---|---|---|---|
| 5,598,092 A * | 1/1997 | Ohtsuka | G05F 1/652 323/222 |
| 5,638,540 A * | 6/1997 | Aldous | G06F 1/263 713/300 |
| 5,801,518 A * | 9/1998 | Ozaki | H02M 3/156 323/222 |
| 6,462,507 B2 * | 10/2002 | Fisher, Jr. | H02J 7/0068 307/66 |
| 7,982,434 B2 * | 7/2011 | Kimball | H02J 1/102 307/66 |
| 2004/0090804 A1 * | 5/2004 | Lipcsei | H02M 3/156 363/41 |
| 2006/0125488 A1 * | 6/2006 | Murphy | G01D 3/0365 324/537 |
| 2008/0288123 A1 * | 11/2008 | Krishnan | G06F 1/3203 700/295 |

(Continued)

*Primary Examiner* — Tung X Nguyen
*Assistant Examiner* — Dominic Hawkins
(74) *Attorney, Agent, or Firm* — John R. Pessetto; Charles A. Brill; Frank D. Cimino

(57) ABSTRACT

A circuit, system, and method for tracking energy use in a electronic circuit. A circuit includes a DC-DC converter and a comparator. The DC-DC converter is configured to maintain a desired output voltage by switching energy to an energy storage device based on an output voltage of the energy storage device. The DC-DC converter includes an output driver configured to source current to the energy storage device. The comparator is coupled to the DC-DC converter. The comparator is configured to identify a drive state of the output driver, and to generate a signal indicative of amount of energy transferred from the DC-DC converter to a load circuit. The signal corresponds to the identified drive state.

20 Claims, 3 Drawing Sheets

(56) References Cited

U.S. PATENT DOCUMENTS

| | | | | |
|---|---|---|---|---|
| 2009/0261999 A1* | 10/2009 | Ramaswami | ....... | H03M 1/1095 |
| | | | | 341/120 |
| 2010/0265406 A1* | 10/2010 | Shishido | ................ | H04N 19/43 |
| | | | | 348/699 |
| 2011/0050945 A1* | 3/2011 | Konno | .................... | H04N 5/232 |
| | | | | 348/222.1 |
| 2014/0167716 A1* | 6/2014 | Chen | ..................... | H02M 3/156 |
| | | | | 323/271 |
| 2014/0327467 A1* | 11/2014 | Diewald | ................ | G01R 31/40 |
| | | | | 324/764.01 |

* cited by examiner

ENERGY TRACKING CIRCUIT

BACKGROUND

As mobile electronic devices and systems increase in number, techniques for reducing energy consumption become increasingly important. Mobile electronic systems are typically powered by batteries or other energy sources of limited capacity. Complex power management schemes may be employed in an attempt to reduce the energy consumption of the electronic device and extend the operational life of the energy source. Such power management schemes can be facilitated by accurate real-time measurement of the energy consumed by the device over a wide range of energy use. For example, energy consumption in a mobile device may vary over a range of up to six orders of magnitude or more, and efficient management of energy consumption in the device may require accurate measurement of energy consumption over the entire range.

SUMMARY

A circuit, system, and method for tracking energy consumption in electronic systems are disclosed herein. In one embodiment, a circuit includes a DC-DC converter and a comparator. The DC-DC converter is configured to maintain a desired output voltage by switching energy to an energy storage device based on an output voltage of the energy storage device. The DC-DC converter includes an output driver configured to source current to the energy storage device. The comparator is coupled to the DC-DC converter. The comparator is configured to identify a drive state of the output driver, and to generate a signal indicative of amount of energy transferred from the DC-DC converter to a load circuit. The signal corresponds to the identified drive state.

In another embodiment, a method includes driving, by a DC-DC converter, an energy storage device coupled to an output driver of the DC-DC converter. A comparator coupled to the output driver identifies a drive state of the output driver. A signal indicative of amount of energy transferred to the energy storage device is generated by the comparator. The signal corresponds to the identified drive state In a further embodiment, an energy tracking system includes a DC-DC converter, a comparator, and an energy accumulator. The DC-DC converter is configured to maintain a desired output voltage by switching energy to an energy storage device based on an output voltage of the energy storage device. The DC-DC converter includes an output driver configured to source current to the energy storage device. The comparator is coupled to the DC-DC converter. The comparator is configured to identify a drive state of the output driver, and to generate a signal indicative of amount of energy transferred to the energy storage device. The signal corresponds to the identified drive state. The energy accumulator is coupled to an output of the comparator. The energy accumulator is configured to measure energy flowing from the energy storage device over time based on the signal generated by the comparator.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. The recitation "based on" is intended to mean "based at least in part on." Therefore, if X is based on Y, X may be based on Y and any number of additional factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Conventional electronic systems apply various measurement techniques to determine the amount of energy consumed by a component or portion of the system. For example, energy may be provided to a portion of the system via a shunt, and voltage across the shunt may be measured to determine the current flowing to the portion of the system. Unfortunately, such measurement techniques can detrimentally affect system efficiency and operational life, and a wide range of voltage values may be difficult to measure accurately.

The energy tracking circuit and system disclosed herein allow energy consumed by an electronic circuit to be measured without interfering with circuit operation or reducing the efficiency of the power supply circuitry. The energy tracking circuitry disclosed herein monitors the DC-DC converter output drive signal to determine when energy is being transferred from a power source (e.g., a battery) to an energy storage device associated with the DC-DC converter. Discrete energy transfers are accumulated to measure the energy provided to the load over time.

Figure 1:
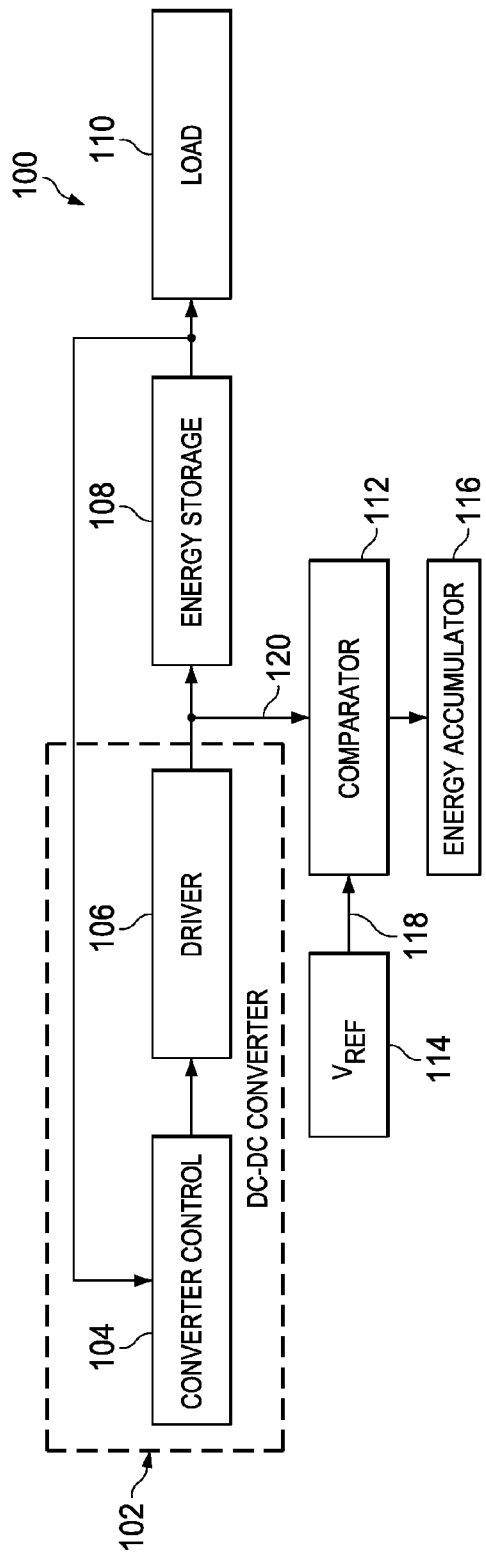
FIG. 1 shows a block diagram of a circuit for tracking energy transfer from a DC-DC converter in accordance with principles disclosed herein.

FIG. 1 shows a block diagram of a circuit 100 for tracking energy transfer from a DC-DC converter in accordance with principles disclosed herein. The circuit 100 includes a DC-DC converter circuit 102, an energy storage device 108, a load circuit 110, a comparator 112, a voltage reference 114, and an energy accumulator 116. The load circuit 110 draws energy from the energy storage device 108. The load circuit 110 may include a processor, such as a microprocessor, a digital signal processor, a microcontroller, and/or other circuitry. In some embodiments, the load circuit 106 may be processor (e.g., a microcontroller). In some embodiments, the DC-DC converter 102 and the comparator 112 are embodied in separate and distinct integrated circuits. The DC-DC converter 102 may not be arranged to facilitate measurement of energy transfer to the load 110, and by coupling the comparator 112 to the DC-DC converter 102, embodiments allow measurement of energy transferred from DC-DC converter circuit 102 through the energy storage device 108 to the load 110.

The DC-DC converter 102 may be configured to implement a buck converter, a boost converter, a buck-boost converter, a fly-back converter, a SEPIC converter, etc. The DC-DC converter circuit 102 includes an output driver 106 and converter control circuitry 104. The output driver 106 is coupled to the energy storage device 108 and sources current to the energy storage device 108. The energy storage device 108 may be an inductor. The converter control circuitry 104 is coupled to the output driver 106 and the output side of the energy storage device 108. The converter control circuitry 104 monitors the voltage at the output of the energy storage device 108 and triggers the output driver 106 to drive current to the energy storage device 108 such that the output of the storage device 108 maintains a predetermined voltage.

The output driver 106 may include switches that may be opened and/or closed to connect the input of the energy storage device 108 to ground or a power supply voltage, or present a high impedance at the input of the energy storage device 108 as controlled by the converter control circuitry 104. The comparator 112 is coupled to the output of the output driver 106. The reference voltage source 114 is coupled to the comparator 112. The comparator 112 monitors the output signal 120 of the output driver 106 to identify the state of the output driver 106. The comparator 112 may identify states of the output driver 106 that indicate energy is being transferred to the energy storage device 108, that energy has been transferred to the energy storage device 108, etc. The comparator 112 identifies the output driver state by comparing the voltage generated by the voltage reference 114 to the voltage of the output signal 120 generated by the output driver 106. In some embodiments, transfer of energy to the energy storage device 108 may be indicated when the reference voltage 118 exceeds the voltage of the output driver output signal 120.

In some embodiments of the circuit 100, each transfer of energy identified by the comparator 112 represents a predetermined, fixed measure of energy. For example, the DC-DC converter 102 may enable may employ a constant or known transfer time (e.g., a fixed of known enable time to the driver 106) to transfer energy to the energy storage device 108. In other embodiments, the amount energy represented by each identified transfer may vary. For example, the duration of an output driver state identified by the comparator 112 may indicate the amount of energy transferred.

The energy accumulator 116 measures the energy transferred to the load 110 from the energy storage device 108 over time by accumulating the energy associated with each transfer identified by the comparator 112. The energy accumulator 116 determines the amount of energy associated with each transfer identified by the comparator 112 and adds the determined amount of energy to a previously accumulated energy total to compute the total amount of energy transferred to the load 110. Measurement of the energy transferred to the load circuit 110, via the comparator 112 and energy accumulator 116, does not affect the voltage provided to the load circuit 110 or the operation or efficiency of the DC-DC converter or the load circuit 110. Because embodiments measure energy transfer in discrete units, the comparator output signal may represent energy transfer to the energy storage 108 in a range that allows the energy accumulator to measure current consumption by the load circuit 110 in a range of milli-amperes to nano-amperes.

Some embodiments of the circuit 100 may also include calibration circuitry for normalizing the power consumption during operation of the load circuit 110. For example, a reference impedance/resistance may be switchably coupled to the output of the energy storage 108 (i.e., a calibration resistor may be coupled to the output of the energy storage 106 via a switch). During a reference measurement for calibrating/normalizing the energy measurement values applied by the energy accumulator 116, the load circuit 110 may not be coupled to the output of the energy storage 108. Instead of the load circuit 110, the reference impedance/ resistance can be connected to the output of the energy storage 108. In some embodiments, the load circuit 110 and the reference impedance/resistance may be coupled to the output of the energy storage during the reference measurement. The energy accumulator 116 can apply a result of the reference measurement with the well characterized reference impedance/resistance to calibrate the measurement for the operation with the load circuit 110.

Figure 2:
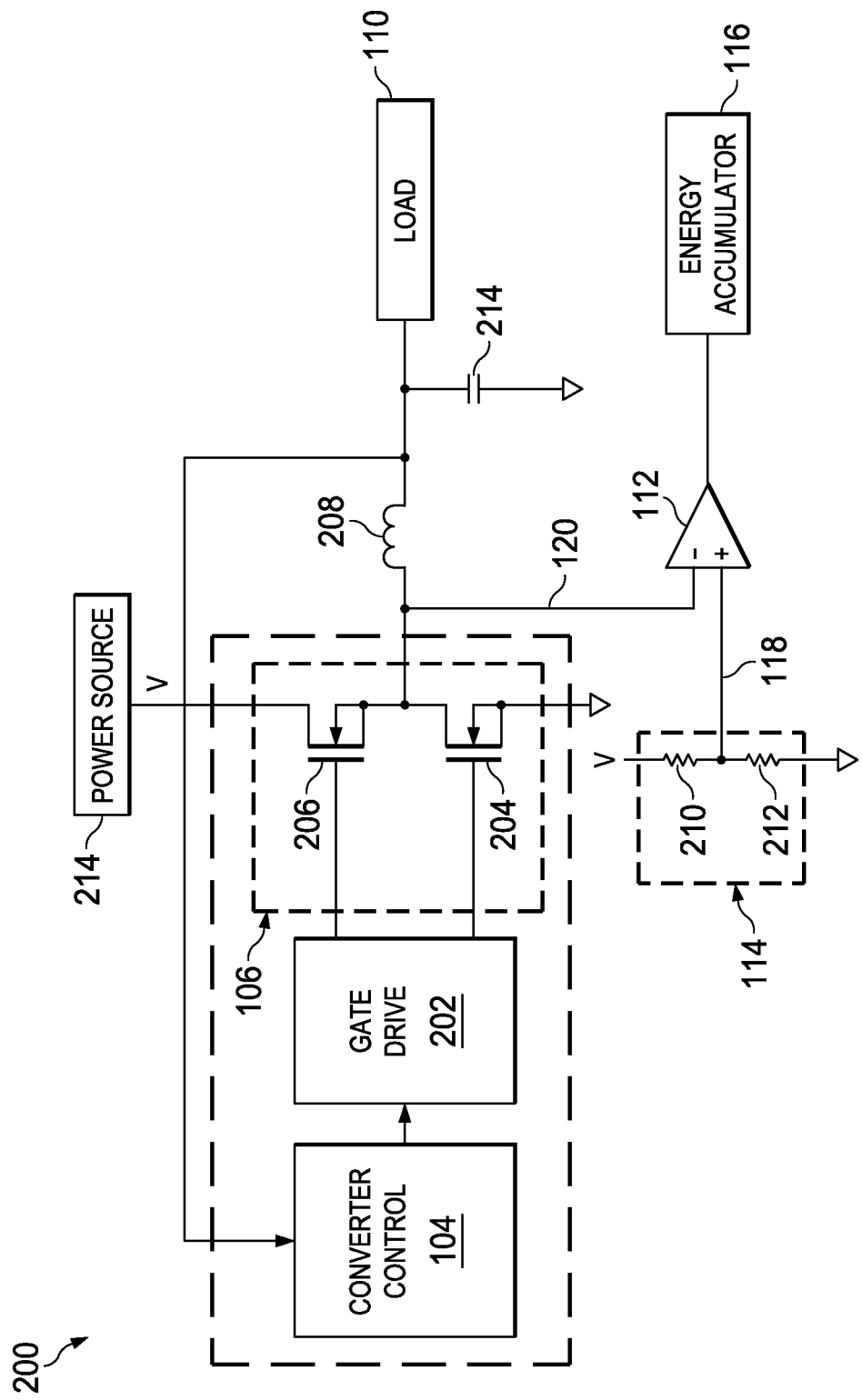
FIG. 2 shows a schematic diagram of a circuit for tracking energy transfer from a DC-DC converter in accordance with principles disclosed herein.

FIG. 2 shows a schematic diagram of a circuit 200 for tracking energy transfer from a DC-DC converter in accordance with principles disclosed herein. The circuit 200 may be an implementation of or similar to the circuit 100. The output driver 106 includes drive transistors 204 and 206. The drive transistors 204 and 206 are driven by gate drive circuit 202, which is controlled by the converter control circuitry 104. The output driver 106 is coupled to the inductor 208, which serves as the energy storage 108.

The transistor 206 connects the inductor 208 to power supply voltage (V), provided by power source 214 when activated by the gate drive circuit 202. The power source 214 may be a direct current (DC) power source such as a battery or an energy harvesting system, such as a photovoltaic cell. The transistor 204 connects the inductor 208 to ground when activated by the gate drive circuit 202. Energy stored in the inductor 208 is transferred to the capacitor 214 and the load 110. The voltage provided to the load circuit 110 may be higher or lower than the voltage provided by the power source 214.

The transistor 206 controls transfer of energy from the power source 214 to the inductor 208. Each of the transistors 208, 208 is disabled when the other enabled. The converter control circuitry 104 controls the transistors 206, 208 to maintain the output of the inductor 208 at a predetermined voltage. The converter control circuitry 104 monitors inductor output voltage and causes the gate drive circuit 202 to generate pulse signals that control the operation of the transistors 206, 208. When inductor output voltage drops below a predetermined voltage, the converter control circuitry 104 causes the gate drive circuit 202 to activate the transistor 206 to transfer energy to the inductor 208. The converter control circuitry 104 includes analog comparison circuitry to compare inductor output voltage to a reference voltage for determination of when the transistors 206, 208 are to be activated. The gate drive circuit 202 may include pulse generation circuitry to generate pulse signals that activate the transistors 206, 208.

The comparator 112 monitors the output signal 120 of the DC-DC convertor 102 generated by the drive transistors 204, 206, and compares the output signal to the reference voltage 118. The voltage reference 114 includes resistors 210 and 212 coupled to form a voltage divider that generates the reference voltage 118 as a fractional portion of the voltage V. Other embodiments of the voltage reference 114 may include different and/or additional components (e.g., a voltage regulator, Zener diode, etc.) for generation of the reference voltage 118. The comparator 112 is connected to the output driver 106 and the voltage reference 114 such that comparison of the reference voltage 118 to the output signal 120 of the output driver 106 identifies the activation and/or duration of activation of the drive transistor 204 and/or the drive transistor 206.

Figure 3:
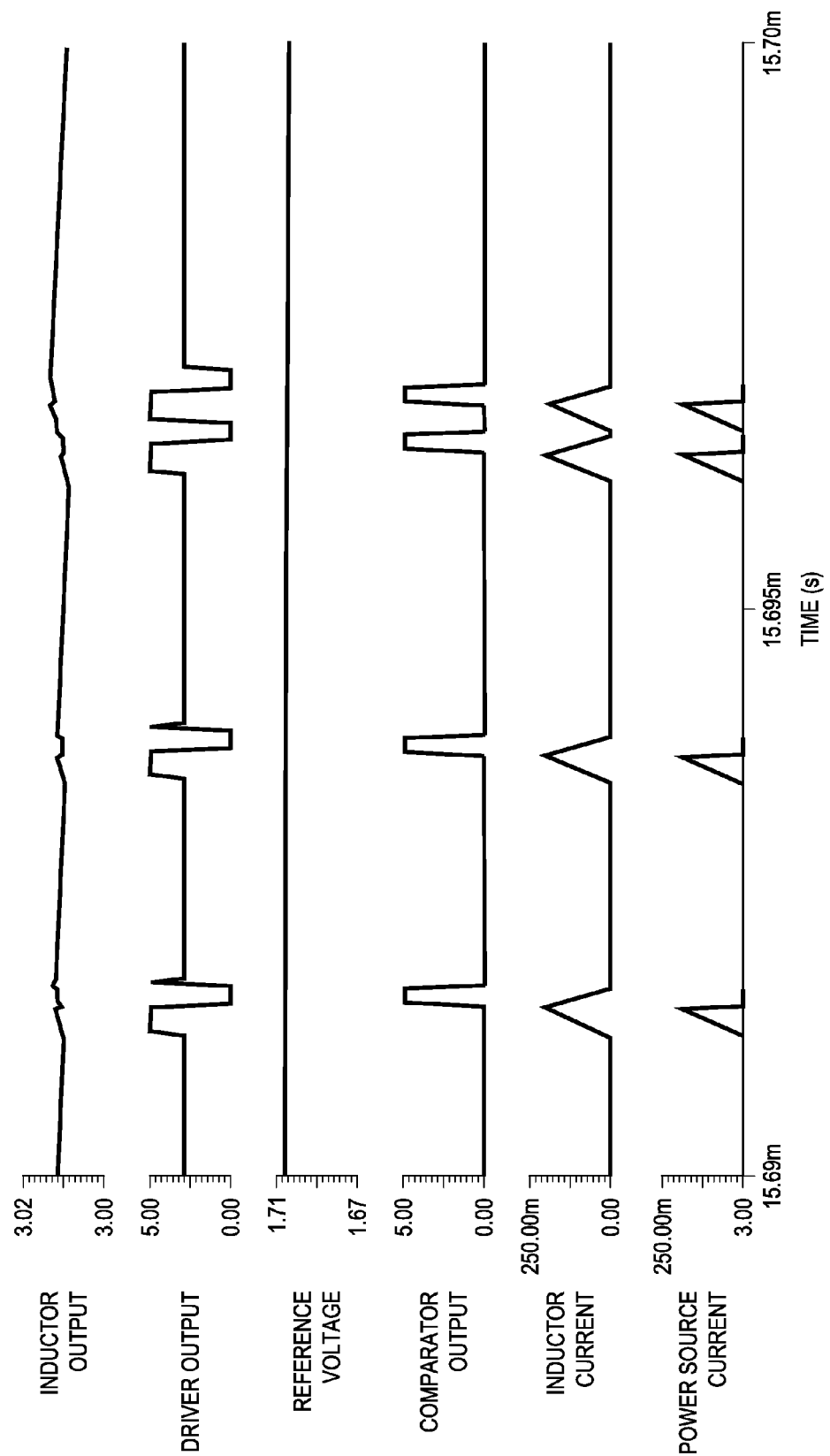
FIG. 3 shows a flow diagram for method for tracking energy in an electronic circuit in accordance with principles disclosed herein.

FIG. 3 shows a diagram of illustrative signals generated in a circuit for tracking energy transfer from a DC-DC converter in accordance with principles disclosed herein. The output signal 120 of the output driver 106, the output signal of the comparator 112, the output of the voltage reference 118, the voltage at the output of the inductor 208, inductor current, and power supply current are shown. As explained above, the comparator 112 compares the output signal 120 generated by the output driver 106 to the reference voltage 118 generated by the voltage reference 114. The output signal generated by the comparator 112 is indicative of intervals during which the drive transistor 204 is active to connect the inductor 208 to ground, and each such interval may represent a transfer of energy to the inductor 208.

Figure 4:
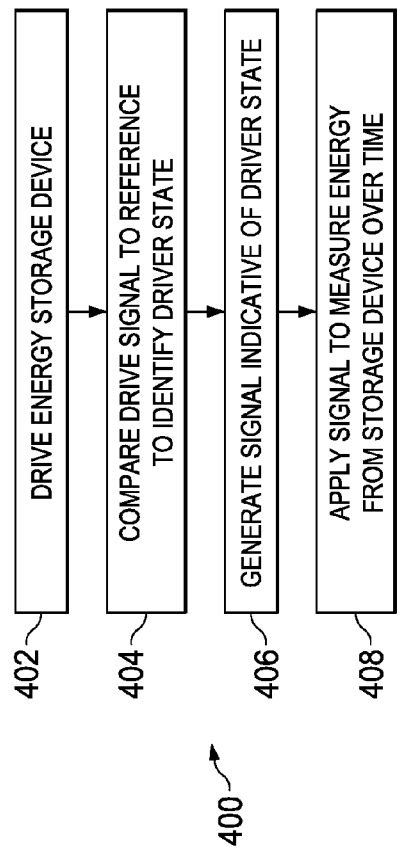
FIG. 4 shows a diagram of illustrative signals generated in a circuit for tracking energy transfer from a DC-DC converter in accordance with principles disclosed herein.

FIG. 4 shows a flow diagram for method 400 for tracking energy in an electronic circuit in accordance with principles disclosed herein. Though depicted sequentially as a matter of convenience, at least some of the actions shown can be performed in a different order and/or performed in parallel. Additionally, some embodiments may perform only some of the actions shown.

In block 402, the DC-DC converter 102 is driving the energy storage device 108 to provide energy to operate the load circuit 110. The output driver 106 of the DC-DC converter 102 may connect the energy storage device 108 to ground, a power supply voltage, etc. as needed to control the voltage presented to the load 110.

In block 404, the comparator 112 compares the output signal 120 generated by the output driver 106 to a reference voltage 118. By comparing the driver output signal 120 to the reference voltage 118, the comparator 112 can identify a state of the output driver 106 indicative of energy transfer to the energy storage device 108 from the power source 214.

In block 406, the comparator 112 generates a signal indicative of the output driver 106 being in a state in which signals transfer of energy to the energy storage device 108. The signal may be a pulse of duration equally to the identified state of the output driver 106. The signal may indicate transfer of a predetermined amount of energy to the storage device 108 in some embodiments. In other embodiments, the duration of the signal may be proportionate to the amount of energy transferred.

In block 408, the signal generated by the comparator 112 is applied to measure the amount of energy transferred from the energy storage device 108 over time. For example, the energy accumulator 116 may determine what amount of energy corresponds to each pulse generated by the comparator 112, and add the determined amount of energy to an accumulated energy value.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A circuit, comprising:
   a DC-DC converter configured to maintain a desired output voltage by switching energy to an energy storage device based on an output voltage of the energy storage device, the DC-DC converter comprising an output driver configured to source current to the energy storage device;
   a comparator coupled to the DC-DC converter, the comparator configured to:
      identify a drive state of the output driver, wherein identification of the drive state comprises identification of activation of a drive transistor of the output driver; and
      generate a signal indicative of amount of energy transferred from the DC-DC converter to a load circuit, wherein the signal corresponds to the identified drive state.

2. The circuit of claim 1, wherein a first input of the comparator is connected to an output of the output driver and a second input of the comparator is connected to a reference voltage.

3. The circuit of claim 1, further comprising an energy accumulator coupled to an output of the comparator, the energy accumulator configured to measure energy flowing to the energy storage device over time based on the signal generated by the comparator.

4. The circuit of claim 1, wherein the comparator is configured to detect connection of the energy storage device to ground through the output driver, and the signal is representative of a time the output driver connects the energy storage device to ground.

5. The circuit of claim 1, wherein the energy storage device is an inductor.

6. The circuit of claim 1, wherein the signal is indicative of current flow from the energy storage device in a range of milli-amperes to nano-amperes.

7. The circuit of claim 1, wherein the signal comprises a plurality of pulses each representing transfer of an equal amount of energy to the energy storage device.

8. A method, comprising:
   driving, by a DC-DC converter, an energy storage device coupled to an output driver of the DC-DC converter;
   identifying, by a comparator coupled to the output driver, a drive state of the output driver, wherein identifying the drive state commprises indentifying activation of a drive transistor of the output driver; and
   generating, by the comparator, a signal indicative of amount of energy transferred to the energy storage device by the DC-DC converter, wherein the signal corresponds to the identified drive state.

9. The method of claim 8, wherein a first input of the comparator is connected to an output of the output driver and a second input of the comparator is connected to a reference voltage.

10. The method of claim 8, further comprising measuring, by an energy accumulator coupled to an output of the comparator, energy flowing to the energy storage device over time based on the signal generated by the comparator.

11. The method of claim 8, further comprising detecting, by the comparator, connection of the energy storage device to ground through the output driver, wherein the signal is representative of time the output driver connects the energy storage device to ground.

12. The method of claim 8, the energy storage device is an inductor.

13. The method of claim 8, wherein the signal is indicative of current flow from the energy storage device in a range of milli-amperes to nano-amperes.

14. The method of claim 8, wherein the signal comprises a plurality of pulses each representing transfer of an equal amount of energy to the energy storage device.

15. An energy tracking system, comprising:
   a DC-DC converter configured to maintain a desired output voltage by switching energy to an energy storage device based on an output voltage of the energy storage device, the DC-DC converter comprising an output driver configured to source current to the energy storage device;
   a comparator coupled to the DC-DC converter, the comparator configured to:
   identify a drive state of the output driver; and
   generate a signal indicative of amount of energy transferred to the energy storage device by the DC-DC converter, wherein the signal corresponds to the identified drive state;
   an energy accumulator coupled to an output of the comparator, the energy accumulator configured to measure energy flowing to the energy storage device over time based on the signal generated by the comparator.

16. The system of claim 15, wherein a first input of the comparator is connected to an output of the output driver and a second input of the comparator is connected to a reference voltage.

17. The system of claim 15, wherein the output driver comprises a switch that when closed connects the energy storage device to ground, and wherein the comparator is configured to detect connection of the energy storage device to ground through the switch, and the signal is representative of time the switch connects the energy storage device to ground.

18. The system of claim 15, wherein the energy storage device is an inductor.

19. The system of claim 15, wherein the signal is indicative of current flow from the energy storage device in a range of milli-amperes to nano-amperes.

20. The system of claim 15, wherein the signal comprises a plurality of pulses each representing transfer of an equal amount of energy to the energy storage device and to a load circuit.

* * * * *